US008794978B2

(12) United States Patent
Koyama et al.

(10) Patent No.: US 8,794,978 B2
(45) Date of Patent: Aug. 5, 2014

(54) EDUCATIONAL MATERIAL PROCESSING APPARATUS, EDUCATIONAL MATERIAL PROCESSING METHOD, EDUCATIONAL MATERIAL PROCESSING PROGRAM AND COMPUTER-READABLE RECORDING MEDIUM

(75) Inventors: Toshiya Koyama, Kanagawa (JP); Michihiro Tamune, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1523 days.

(21) Appl. No.: 11/333,288

(22) Filed: Jan. 18, 2006

(65) Prior Publication Data

US 2007/0031802 A1 Feb. 8, 2007

(30) Foreign Application Priority Data

Aug. 2, 2005 (JP) ................................. 2005-223697

(51) Int. Cl.
*G09B 7/00* (2006.01)

(52) U.S. Cl.
USPC .......................................................... 434/323

(58) Field of Classification Search
CPC .................................... G09B 7/06; G09B 7/04
USPC .................. 434/118, 365, 350, 322, 323, 362
See application file for complete search history.

(56) References Cited

U.S. PATENT DOCUMENTS

| | | | | |
|---|---|---|---|---|
| 4,021,938 A | * | 5/1977 | Antioco ........................ 434/354 |
| 5,085,587 A | * | 2/1992 | DesForges et al. ............ 434/355 |
| 5,140,139 A | * | 8/1992 | Shepard ........................ 235/456 |
| 5,219,291 A | * | 6/1993 | Fong et al. .................... 434/323 |
| 5,229,589 A | * | 7/1993 | Schneider ..................... 235/456 |
| 5,775,918 A | * | 7/1998 | Yanagida et al. ............. 434/353 |
| 6,064,856 A | * | 5/2000 | Lee et al. ...................... 434/350 |
| 6,678,499 B1 | * | 1/2004 | Silverbrook et al. ......... 434/350 |
| 7,764,923 B2 | * | 7/2010 | Saito ............................. 434/353 |
| 2002/0031756 A1 | * | 3/2002 | Holtz et al. ................... 434/362 |
| 2005/0226541 A1 | * | 10/2005 | McIntosh et al. ............. 382/306 |

FOREIGN PATENT DOCUMENTS

| | | |
|---|---|---|
| JP | 05-165394 A | 7/1993 |
| JP | A-9-311621 | 12/1997 |
| JP | 11-202749 A | 7/1999 |
| JP | A 2001-331089 | 11/2001 |
| JP | 2004-348037 A | 12/2004 |
| JP | 2005-189705 A | 7/2005 |

OTHER PUBLICATIONS

Office Action issued in JP Application No. 2005-223697 on Dec. 22, 2010 (with English translation).
Apr. 6, 2011 Office Action issued in Japanese Patent Application No. 2005-223697 (w/English-language Translation).

* cited by examiner

*Primary Examiner* — Kesha Frisby
(74) *Attorney, Agent, or Firm* — Oliff PLC (57) ABSTRACT

An educational material processing apparatus includes: an input unit that inputs an image data of a test material including a plurality of questions, a plurality of answer columns corresponding to the plurality of questions, and accuracy judgment marks indicating whether answers included in the answer columns are correct or not; an identification unit that identifies a position of an answer column judged to include a wrong answer based on at least one of the accuracy judgment marks in the image data of the test material; and a generation unit that generates the image data of the test material including a question corresponding to the answer column judged to include the wrong answer, the position of the answer column identified by the identification unit, with the answer column in vacant state.

8 Claims, 8 Drawing Sheets

| SCIENCE FIFTH GRADE | 1. CHANGE IN CLIMATE AND TEMPERATURE | CLASS GRADE | NAME | POINTS |

(QUESTION 1) ·············································
·································( )
···················( )·············
············( )
 10 POINTS EACH (QUESTION 2) ·············································
·········································
·········································
( ) ( ) 10 POINTS EACH (QUESTION 3) ·············································
·································( )·······
···············( )·············
 10 POINTS EACH (QUESTION 4) ·············································
·········································
·········································
( ) 10 POINTS (QUESTION 5) ·············································
·································( )····
············( )·························
 10 POINTS EACH

| EDUCATIONAL MATERIAL IDENTIFICATION INFORMATION || ANSWERER INFORMATION |
|---|---|---|
| QUESTION NUMBER | ANSWERER COLUMN ID | TEXT EXECUTION COUNT |
| QUESTION 1 | 1-1 | 1  (DONE) |
|  | 1-2 | 2 |
|  | 1-3 | 1  (DONE) |
| QUESTION 2 | 2-1 | 1  (DONE) |
|  | 2-2 | 2 |
| QUESTION 3 | 3-1 | 2 |
|  | 3-2 | 1  (DONE) |
| QUESTION 4 | 4-1 | 1  (DONE) |
| QUESTION 5 | 5-1 | 2 |
|  | 5-2 | 1  (DONE) |

| SCIENCE FIFTH GRADE | 1. CHANGE IN CLIMATE AND TEMPERATURE | CLASS 1 GRADE 5 | NAME Taro Yamada | POINTS |

(QUESTION 1) ·················································
············································( a )···············
······························( b )·············
·······( c )···········
         8
                                                    10 POINTS EACH (QUESTION 2) ·················································
···········································
············( d )···( e )   10 POINTS
         8              EACH (QUESTION 3) ·················································
······························( f )·······
·······( g )·············
                        10 POINTS EACH
                      8

(QUESTION 4) ·················································
······················( h )  ) 10 POINTS
                    8

(QUESTION 5) ·················································
·······························( i )····
·······( j )···········
         8
                                                    10 POINTS EACH

FIG. 8

| SCIENCE FIFTH GRADE | 1. CHANGE IN CLIMATE AND TEMPERATURE | CLASS 1 GRADE 5 | NAME Taro Yamada | POINTS |

(QUESTION 1) ································································
················( a )···········( )·············
·····( c )·····
                  8                                          10 POINTS EACH (QUESTION 2) ································································
·······················
        ( d )  ( )   10 POINTS
             8              EACH (QUESTION 3) ································································
·····( g )············( )······
                              } 10 POINTS EACH
                              8

(QUESTION 4) ································································
············( h )  ) 10 POINTS
                  8

(QUESTION 5) ································································
·······( j )············( )····
        8
                                    10 POINTS EACH

EDUCATIONAL MATERIAL PROCESSING APPARATUS, EDUCATIONAL MATERIAL PROCESSING METHOD, EDUCATIONAL MATERIAL PROCESSING PROGRAM AND COMPUTER-READABLE RECORDING MEDIUM

BACKGROUND OF THE INVENTION

1. Field of the Invention

The present invention relates to an educational material processing apparatus and an educational material processing method for handling test educational materials and an educational material processing program and a recording medium for implementing the same.

2. Description of the Related Art

Currently, with the advancement of information communications such as the Internet, computer-based correspondence education is getting more commonplace than ever. Concerning the correspondence education, for example, it is known to provide a correspondence education system comprising marking means for marking answers to examination questions in order to deliver text that considers the learning level of a learner and his/her progress and information processing means for variably setting the difficulty level of an examination question to be sent next time in accordance with the marking result of the marking means.

In an educational institution such as a school and a private cramming school where a teacher and students are involved in a lesson face to face, a question paper or a test paper including a plurality of questions and answer columns for entering the corresponding answers are often used as test materials in order to check the learning level and learning effect of learners. In such a case, the test material is distributed to students taking a test for them to enter answers with a writing utensil such as a pencil. The test material where answers have been entered is collected and a check is made to determine whether the answers to each question are correct or wrong. In this practice, as one of the learning methods for improving the learning ability of students, repetitive learning is sometimes employed where a test is conducted over and over again using the same test material until for example all the answers are correct, in case there is a question to which a wrong answer is made or therein unanswered question.

In such a repetitive learning method, the same test material is used to conduct a test repeatedly. In case there is an incorrectly answered question, writing in the answer column is erased with an eraser by a student or a teacher and a new answer is written again in the next test, which answer is subjected to accuracy judgment. It is necessary to conduct a retest with a wrong answer being erased over and over again by using an eraser until all the questions are correctly answered.

SUMMARY OF THE INVENTION

The invention has been accomplished in order to solve the problems and enables a retest to be conducted using an incorrectly answered question without erasing the incorrect answers with an eraser each time a retest is conducted, until all the questions in the test material are correctly answered.

The invention may provide an educational material processing apparatus including: an input unit that inputs an image data of a test material including a plurality of questions, a plurality of answer columns corresponding to the plurality of questions, and accuracy judgment marks indicating whether answers included in the answer columns are correct or not; an identification unit that identifies a position of an answer column judged to include a wrong answer based on at least one of the accuracy judgment marks in the image data of the test material; and a generation unit that generates the image data of the test material including a question corresponding to the answer column judged to include the wrong answer, the position of the answer column identified by the identification unit, with the answer column in vacant state.

The invention may provide an educational material processing method including: inputting a image data of a test material including a plurality of questions, a plurality of answer columns corresponding to the plurality of questions, and accuracy judgment marks indicating whether answers included in the answer columns are correct or not; identifying a position of an answer column judged to include a wrong answer based on at least one of the accuracy judgment marks in the image data of the test material; and generating the image data of a test material including a question corresponding to the answer column judged to include the wrong answer with the answer column in vacant state.

The invention may provide a program product for enabling a computer to process educational material; including: software instructions for enabling the computer to perform predetermined operations; and a computer-readable recording medium bearing the software instructions; wherein the predetermined operations includes: inputting a image data of a test material including a plurality of questions, a plurality of answer columns corresponding to the plurality of questions, and accuracy judgment marks indicating whether answers included in the answer columns are correct or not; identifying a position of an answer column judged to include a wrong answer based on at least one of the accuracy judgment marks in the image data of the test material; and generating the image data of a test material including a question corresponding to the answer column judged to include the wrong answer with the answer column in vacant state.

The invention may provide a computer-readable recording medium storing a program of instructions for enabling a computer to perform a function for processing an educational material, the function including: inputting a imaged at a of a test material including a plurality of questions, a plurality of answer columns corresponding to the plurality of questions, and accuracy judgment marks indicating whether answers included in the answer columns are correct or not; identifying a position of an answer column judged to include a wrong answer based on at least one of the accuracy judgment marks in the image data of the test material; and generating the image data of a test material including a question corresponding to the answer column judged to include the wrong answer with the answer column in vacant state.

BRIEF DESCRIPTION OF THE DRAWINGS

Embodiment may be described in detail with reference to the accompanying drawings, in which.

DETAILED DESCRIPTION OF THE INVENTION

A specific embodiment of the invention will be detailed referring to the drawings.

Figure 1:
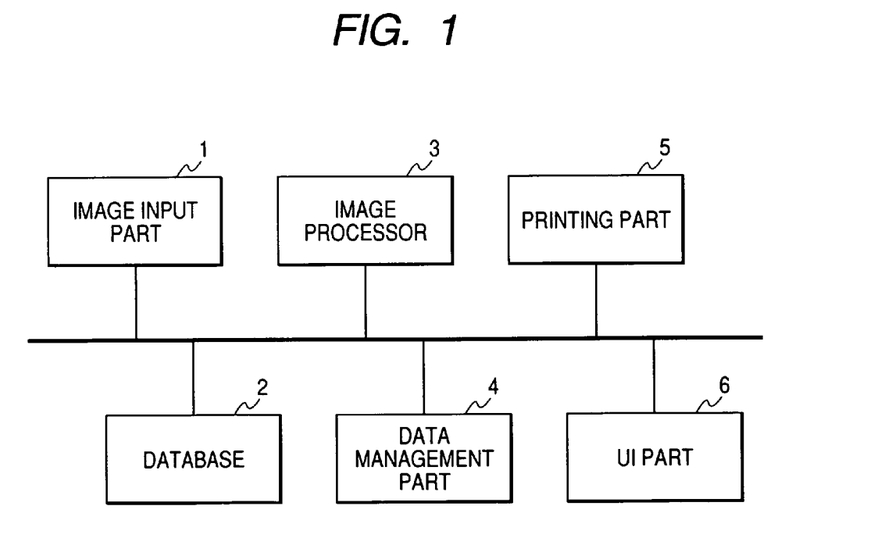
FIG. 1 is a block diagram showing the configuration of educational material processing apparatus according to an embodiment of the invention.

FIG. 1 is a block diagram showing the configuration of educational material processing apparatus according to an embodiment of the invention. The educational material processing apparatus shown in FIG. 1 comprises, roughly speaking, an image input part 1, a database 2, an image processor 3, a data management part 4, a printing part 5 and a user interface part (hereinafter referred to as the "UI part") 6. Functional parts of these components are connected to a common bus.

The image input part 1 inputs the image data of a test material as a target of processing. The image input part 1 is composed of for example a scanner (image read means) for generating the image data (scan data) of the test material by optically reading the image of the test material. In case the image input part 1 is a scanner, it is disable to employ a scanner equipped with an automatic document feeder (hereinafter referred to as the ADF) for setting a plural sheets of test material and continuously reading the images of the plural sheets of the test material.

The image input part 1 is not limited to one equipped with an image reading function. The image input part 1 may be a communications interface part for receiving image data of a test material read by a scanner provided separately from the educational material processing apparatus according to the invention via for example a network such as LAN (Local Area Network) or a cable, or a card reader for reading image data from a memory card storing the image data of the test material. In this embodiment, it is assumed that the image input part 1 is a scanner equipped with an ADF.

Figure 2:
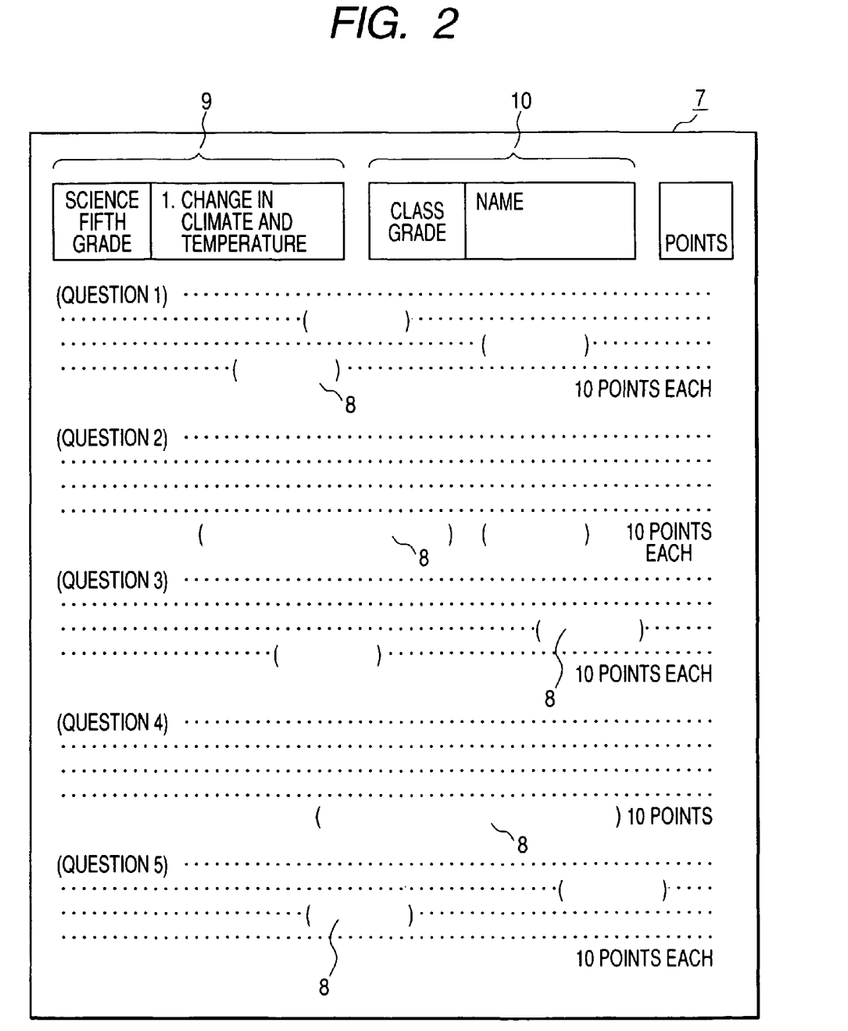
FIG. 2 is a schematic view illustrating a specific example of a test material.

FIG. 2 is a schematic view illustrating a specific example of a test material. As shown in FIG. 2, a test material 7 has a plurality of (10 in this example) answer columns 8 corresponding to a plurality of (five in this example) questions for example assigned serial numbers. To be more precise, an examination paper or a test paper used in an educational institution such as a school and a private cramming school corresponds to a test material. A single answer column 8 may be provided to a single question. Or, a plurality of answer columns 8 may be provided to a single question. In the case of the test material 7 shown in FIG. 2, three answer columns 8 are provided to Question 1, two answer columns 8 for each of Question 2 and Question 3, one answer column 8 for Question 4, and two answer columns 8 for Question 5.

The test material 7 includes the questions mentioned above and an answer column 8 as well as an educational material identification information column 9 and an answerer information column 10. The educational material identification information column 9 is a column where educational material identification information for uniquely identifying the test material 7. The answerer information column 10 is a column where answerer information is entered such as the name, grade and class of a student as an answerer. The educational material identification information column 9 shall describe as educational material identification information for example the subject, applicable grade and title of the test material 7.

Note that the educational material identification information may be described in a character format as shown, an ID (combination of English letters and numerals), or visible information such as a bar code. Or, the educational material identification information may be embedded in an image using a well-known information embedding technique.

The information embedding technique is for example "iTone®" where the form (position, shape) of pixels constituting a full line screen or a dot screen as gradation representation is changed so as to embed digital information into a halftone image. Or, the GroffCode® that represents binary 0s and 1s using a slash and a backslash may be used.

Figure 3:
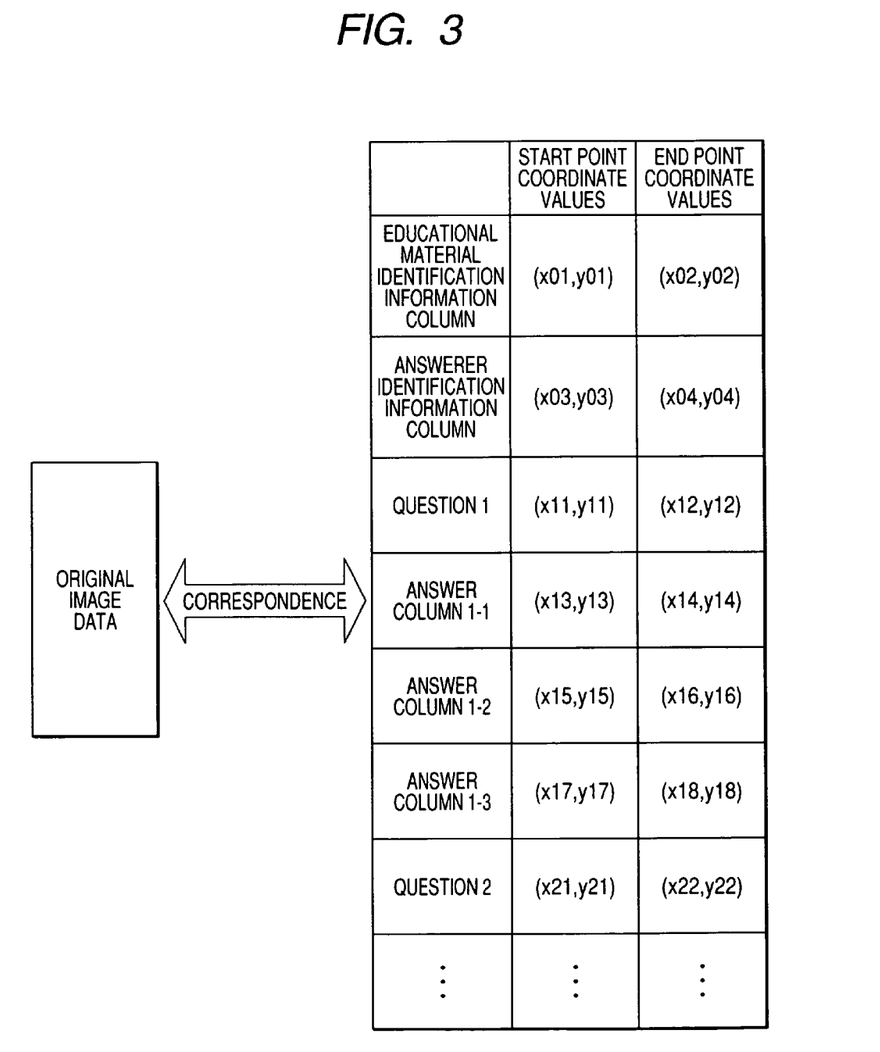
FIG. 3 shows an example of test material data storage in database.

The database 2 is used to store various types of data. The database 2 is for example a large-capacity storage unit such as a hard disk and includes a function to store data as well as a function to process (read, update, delete, retrieve) the stored data. The database 2 includes, as information concerning the test material 7, for example the original image data, educational material identification information and layout information of the test material 7 registered thereon associated with each other, as shown in FIG. 3.

The original image data of the test material 7 refers to the image data of the test material 7 in the blank state, that is, in the state where data is not entered or added in the plurality of answer columns 8 and the answerer information column 10. The original image data of the test material 7 may be obtained by reading the data recorded on a recording medium such as a CD-ROM available from an educational material seller that created the test material 7 and registering (storing) the read data in the database 2. Or, the original image data of the test material 7 may be obtained by reading the image of the test material in the blank state and registering the obtained image data in the database 2.

The educational material identification information of the test material 7 is specific information assigned to each material in order to uniquely identify a test material from among the test materials of different subjects, applicable grades, lessons and sources. The educational material identification information of the test material 7 may be obtained, same as above, by reading the data recorded on a CD-ROM and registering the read data in the database 2, or reading the text information (or code information or embedded information) described in the educational material identification information column of the test material 7 and registering the read data in the database 2.

The layout information of the test material 7 is represents the positions (start point and end point) of each of the plurality of questions, the plurality of answer columns 8, the educational material identification information column 9, and the answerer information column 10 in two-dimensional coordinate data (x, y) in the image area (whole area) of the test material 7 by using as a reference (coordinate origin) the upper left corner position of the test material 7, for example. In this case, assuming that the layout of each portion is specified with a rectangular area frame, the start point coordinate values indicate the coordinate values of the upper left corner of the area frame and the end point coordinate values indicate the coordinate values of the lower right corner of the area frame. The layout information of the test material 7 may be obtained, same as the original data, by reading the data recorded on a CD-ROM and registering the read data in the database 2, or displaying the original image data of the test material 7 on the display screen and specifying, by using an input device such as a mouse and a pen tablet, the positions of the plurality of questions, plurality of answer columns 8, the educational material identification information column 9, and the answerer information column 10 and registering the specified data.

Figure 4:
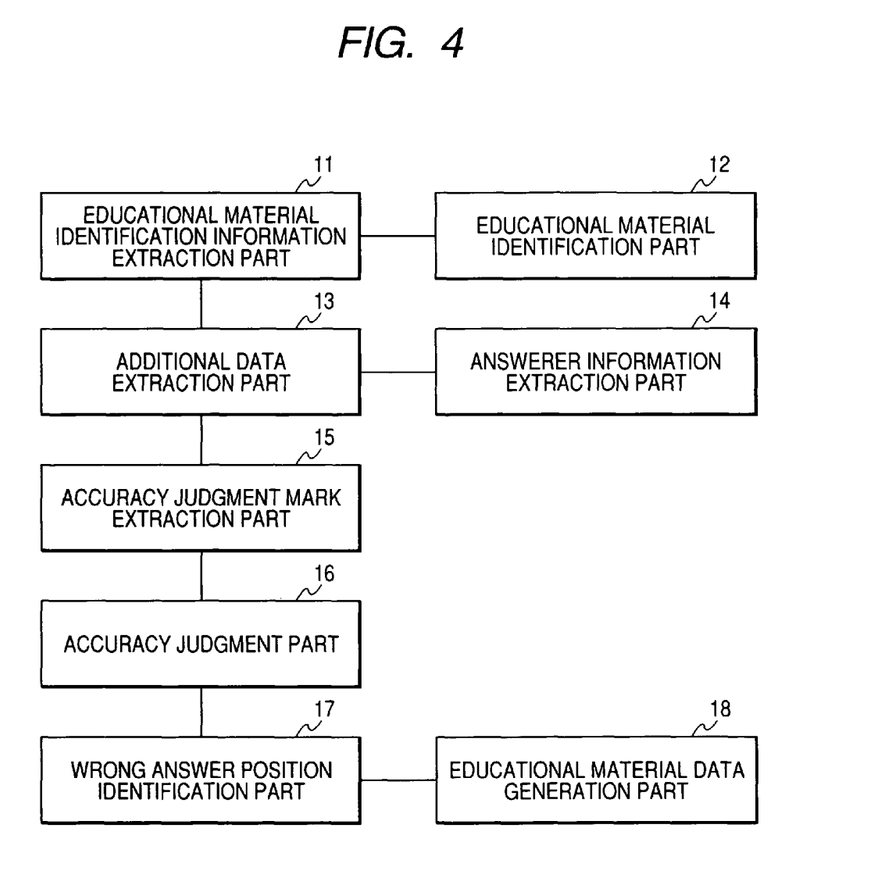
FIG. 4 is a block diagram showing the internal configuration of an image processor.

The image processor 3 performs various types of image processing by using the image data (including the image data of the test material 7) input from the image input part 1. The image processor 3 includes, as part of the image processing function, an educational material identification information extraction part 11, an educational material identification part 12, an additional data extraction part 13, an answerer information extraction part 14, an accuracy judgment mark extraction part 15, an accuracy judgment part 16, a wrong answer position identification part 17, and an educational material data generation part 18, as shown in FIG. 4.

The educational material identification information extraction part 11 extracts educational material identification information described in the educational material identification information column 9 (or embedded with invisible information) from the image data of the test material 7 input from the image input part 1. The educational material identification information extraction part 11 performs OCR (Optical Character Reader) processing, natural language processing, analysis processing or decoding processing as required on the educational material identification information extracted from the image data of the test material.

The educational material identification part 12 identifies a test material in accordance with the educational material identification information extracted by the educational material identification information extraction part 11 Identification of a test material is made by identifying a test material whose educational material identification information is conforming or matches from among the plurality of (large number of) test materials of different subjects or applicable grades registered in the database 2. In case the educational material identification information is recognized by way of OCR processing or natural language processing conversion to test data is not always precise. Thus, when the conformity of the educational material identification information is determined, control is desirably made to allow unmatch of characters below a certain percentage with respect to a preset number of characters or total number of characters.

The additional data extraction part 13 extracts additional data entered on the test material 7 by an answerer or marker (such as a teacher) from among the image data of the test material 7 input from the image input part 1. The additional data extraction part 13 compares the image data of the test material 7 input from the image input part 1 with the original data of the test material 7 stored in the database 2, and extracts the resulting difference data as the additional contents to the test material 7. The difference extraction processing by the additional data extraction part 13 may be made by using a well-known image processing technique (such as one described in JP-A-58-59664).

The answerer information extraction part 14 extracts answerer information from among the additional data extracted by the additional data extraction part 13. The answerer information s entered in the answerer information column 10 with a pencil. It is thus possible to extract the answerer information from among the additional data by specifying the position of the answerer information column 10. The answerer information may be extracted in bitmap image data obtained from the answerer information column 10, or, in text data obtained through OCR processing or natural language processing. In case the answerer information is extracted in bitmap image data, it is possible to uniquely identify the answerer based on the image pattern or characteristic amount of the image, The accuracy judgment mark extraction part 15 extracts the contents added by a marker, that is, an accuracy judgment mark ("O" and "X" marks) indicating whether the answer in the answer column 8 of the test material 7 is correct or wrong, from among the additional data extracted by the additional data extraction part 13. In case a plurality of accuracy judgment marks are added to the test material 7 by the marker, the accuracy judgment mark extraction part 15 extracts all accuracy judgment marks. In case the additional data is extracted by using the difference from the original image data, only the answers and accuracy judgment marks remain, excluding the answerer information described in the answerer information column 10, so that it is possible to extract accuracy judgment marks by differentiating between the answers and accuracy judgments based on a color component. To be more precise, extracting the data of predetermined color component, that is, a red component is extracted from among the additional data. This is because an accuracy judgment mark is generally entered with a red-ink pen.

For example, in case the test material 7 is provided in monochrome printing, it is possible to extract accuracy judgment marks by just specifying the color component of ink in a writing utensil (red component in general) as a target color component, without the need to extract the difference from the original image data.

The accuracy judgment part 16, judges whether an accuracy judgment mark extracted by the accuracy judgment mark extraction part 15 indicates "a correct answer (O) or "a wrong answer (X)". In particular, for example, the shape of an accuracy judgment mark extracted by the accuracy judgment mark extraction part 15 is recognized. The recognized shape is pattern-matched with the pre-registered figure shape of "O". In case the result shows similarity to the figure shape of "O", "a correct answer" is determined. Otherwise "a wrong answer" is determined.

The wrong answer position identification part 17 identifies the position of an answer column judges as a wrong answer by the accuracy judgment mark (marking). In particular, from among the position information (coordinate data) of various answer columns 8 included in the layout information of the test material 7 registered in the database 2, the position information of answer columns 8 closest to an accuracy judgment mark "X" (for example the center position of X) to indicate a wrong answer as judged by the accuracy judgment part 16 is read to identify the positions of answer columns including wrong answers. Or, the position information of the answer columns 8 other than the answer columns 8 closest to an accuracy judgment mark "O" (for example the center position of O) to indicate a correct answer as judged by the accuracy judgment part 16 is read to identify the positions of answer columns including wrong answers. In case both accuracy judgment marks O and X are added in the marking of the test material 7, either the former or latter method may be used to identify the positions of answer columns including wrong answers.

In case "O" is added to answer columns 8 including correct answers and "X" is not added to answer columns 8 including wrong answers in the marking of the test material 7, absence of "O" indirectly shows a wrong answer. In this case, the accuracy judgment part 16 judges that all accuracy judgment marks extracted by the accuracy judgment mark extraction part 15 indicate correct answers. Thus the latter method may be used to identify the positions of answer columns including wrong answers. Although this is a rare case as marking, in case "O" is not added to answer columns 8 including correct answers and "X" is added to answer columns 8 including wrong answers, absence of "X" indirectly shows a correct answer. In this case, the accuracy judgment part 16 judges that all accuracy judgment marks extracted by the accuracy judgment mark extraction part 15 indicate wrong answers. Thus the former method may be used to identify the positions of answer columns including wrong answers.

The educational material data generation part 18 generates the image data of a test material including questions corresponding to the answer columns including wrong answers identified by the wrong answer position identification part 17. In the first place, the educational material data generation part 18 performs processing to convert answer columns including wrong answers to original blank columns. The following methods are used for this purpose. The first method replaces the image data of answer columns including wrong answers (including answer columns without answers) with the original image data of the test material 7 registered in the database 2. The second method replaces the image data of answer columns including wrong answers and their corresponding questions with the original image data of the test material 7 registered in the database 2. The third method fills in answer columns including wrong answers with the color of the background of the answer columns.

In case the first method is employed, the minimum necessary data is used to replace the image data, which is expected to boost the processing. In case the second method is employed, image data is replaced including questions to which wrong answers were described. For example, in case an answer column is arranged in the text of question or an accuracy judgment mark (X) is assigned to an answer column including a wrong answer, a state close to the original data is faithfully reproduced. In case the third method is employed, an answer column including a wrong answer may be converted to a blank column without reading the original image data of the test material 7 registered in the database 2, which is expected to boost the processing.

Other methods include: a method for replacing answer columns corresponding to the correct answers of (a copy of) the original image data of the test material with answer columns judged to include correct answers with accuracy judgment marks on the image data of the test material; a method for replacing answer columns corresponding to the correct answers of the original image data of the test material with the image areas occupied by answer columns judged to include correct answers and corresponding questions; and a method for writing correct answers previously stored in the database into answer columns corresponding to the correct answers of the original image data of the test material in order to generate a test material where only the answer columns including wrong answers in the last test appear blank.

The data management part 4 manages various types of data management using the database 2. As one of its management items, the data management part 4 manages the test execution count (repetitive learning count) up to when a correct answer is entered in the answer column 8 corresponding to each of the plurality of questions included in the test material 7 for each student classified by answerer information, for example using a management table shown in FIG. 5. The management table is registered in the database 2, one for each answerer identified by answerer information and a test material identified by educational material identification information. The database 2 registers, as attribute information of the management table, educational material identification information (such as a subject, applicable grade and title) described in the educational material identification information column 9 of the test material 7 and answerer information (grade and name of an answerer) described in the answerer information column of the test material 7. Each management table registers an answer column corresponding to each of the questions included in the test material and the text execution count up to when a correct answer is entered in each answer column for each question.

For the answer columns, for example, as in the test material 7 illustrated in FIG. 2, in case three answer columns 8 are provided to Question 1, identification numbers (IDs) 1-1, 1-2 and 1-3 shall be assigned. In case two answer columns 8 are provided to each of Question 2 and Question 3, identification numbers 2-1, 2-2 and identification numbers 3-1, 3-2 shall be assigned respectively. In case one answer column 8 is provided to Question 4, an identification number 4-1 shall be assigned. In case two answer columns 8 are provided to Question 5, identification numbers 5-1, 5-2 shall be assigned. For the test execution count, an initial value "1" shall be set when the table is created (at the time of registration).

The printing part 5 prints image data on a sheet medium such as paper by using a printing material including ink and toner. The printing part 5 may be a printer engine for printing image data in accordance with an electronic photography such as xerography.

The UI part 6 serves as a user interface that lets the user of educational material processing apparatus enter various types of information and presents various types of information to the user. The UI part 6 is composed of an input operation part including various buttons, switches and key and a display part such as a liquid crystal display.

The educational material processing apparatus thus configured may be implemented for example by image formation apparatus such as a digital color copier and a digital color multifunction device. A combination of a personal computer (hereinafter referred to as a PC) and a printer as well as a combination of a scanner, a PC, and a printer may be used. The functional parts except the printing part 5 (numerals 1, 2, 3, 4, 6) may be implemented by a PC alone.

Figure 6:
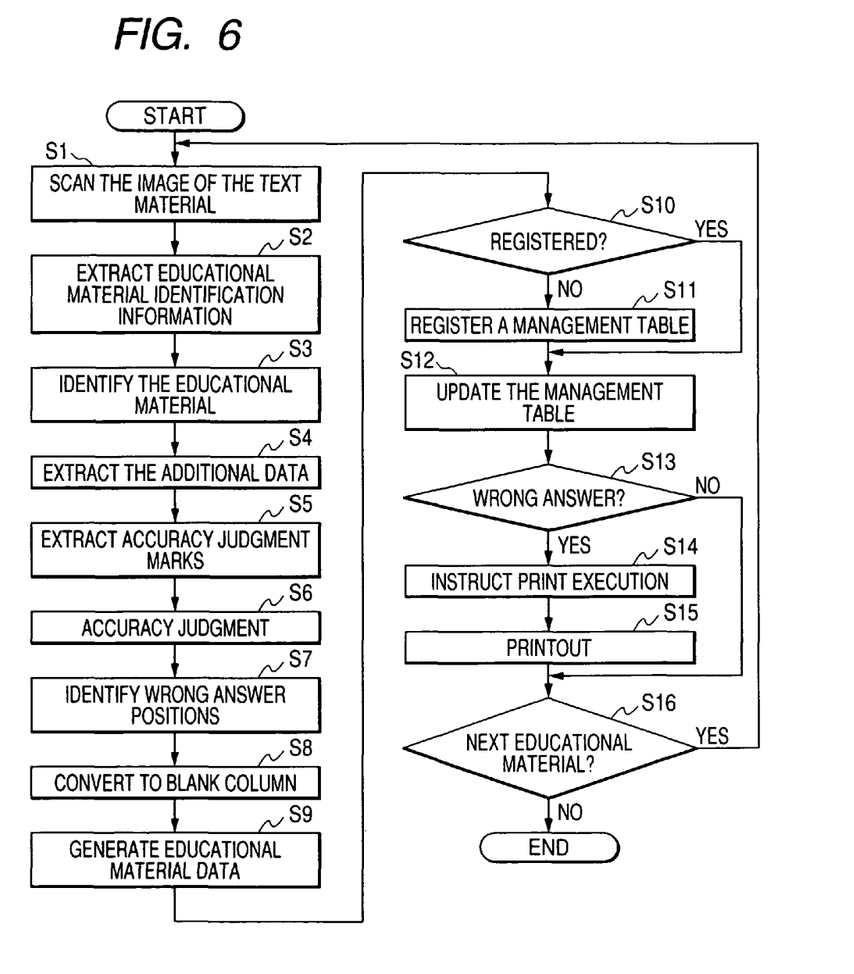
FIG. 6 is a flowchart showing an educational material processing method according to an embodiment of the invention.
Figure 7:
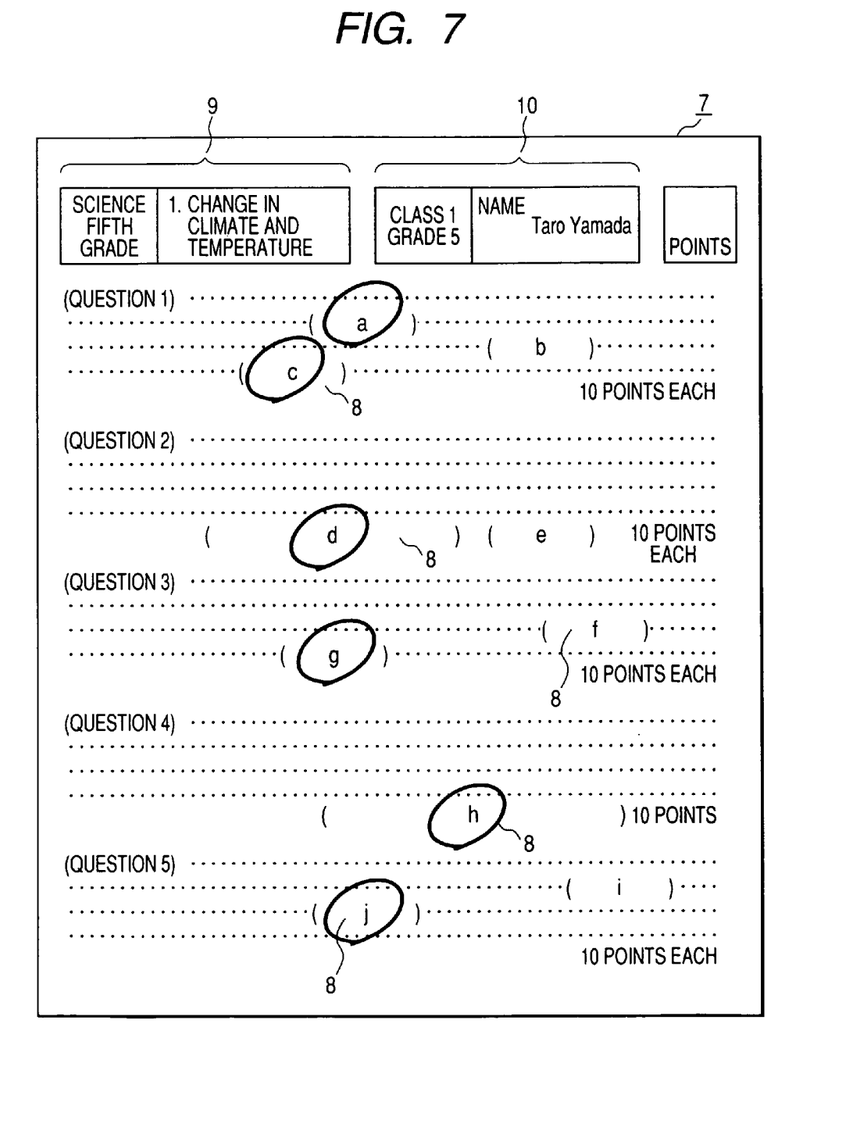
FIG. 7 shows a specific example of a test material handled in this invention.

Next, a specific procedure of the educational material processing method that uses the educational material processing apparatus according to this embodiment will be described using the flowchart of FIG. 6. A specific example of a test material 7 handled in this invention is shown in FIG. 7. The test material 7 shown has an answerer information column 10 with answerer information (grade, class name) filled in, and a plurality of answer columns 8 corresponding to a plurality of questions with answers (a, b, c, d, e, f, g, h, i, j) filled in by the answerer with a pencil, and accuracy judgment marks indicating whether the answers are correct by the marker with a red-ink pen. The method for describing an accuracy judgment mark in this example uses a system where "O" is assigned to an answer column 8 where a correct answer is entered and "X" is not assigned to an answer column 8 where a wrong answer is entered or an answer is not entered.

In case such a test material 7 is processed by the educational material processing apparatus, as an exemplary procedure, the user (typically a teacher) classifies plural sheets of test material 7 subjected to examination and marking ob a per class basis or on a per grade basis, sets the test material 7 on the document glass of an image input part (scanner 1), and instructs start of processing by way of button operation on the UI part 6. This causes the ADF to transfer the first sheet of the test material 7. The image of the test material 7 is read (scanned) by the image input part 1 and the image data as the read data is input (step 1).

Next, by using the image data of the test material 7 already read is subjected to processing by an image processor 3. In an educational material identification information extraction; part 11, the educational material identification information described in an educational material identification information column is extracted (step S2).

By using the extracted educational material identification information, the educational material identification part 12 identifies the test material 7 of which the image is input (read) this time from among the plurality of test materials registered in the database 2.

Next, the additional data extraction part 13 extracts the image data representing the additional data, namely, the answerer information, answers and accuracy judgment marks on the test material 7 (step S4). In this practice, in case the original image data of the test material 7 is used to extract the additional data (data of difference from the original), a search is made through the database 2 for the original image data of the test material 7 from the image data of the test material 7 read by the image input part 1 while using as a search key the educational material identification information read from the educational material identification information column 9, in order to read the original image data of the test material 7 from the database 2.

Next, the accuracy judgment mark extraction part 15 extracts accuracy judgment marks (in this case "O") from the additional data extracted above (step S5). For the test material 7 shown in FIG. 7, total six accuracy judgment marks are extracted.

For each extracted accuracy judgment mark, the accuracy judgment part 16 judges whether the accuracy judgment mark indicates a correct answer or a wrong answer (step S6). In case a rule is applied, as in this example, where an accuracy judgment mark "O" is added to only answer columns including correct answers, all accuracy judgment marks extracted by the accuracy judgment mark extraction part 15 indicate correct answers so that the accuracy judgment part 16 may be done without.

Next, based on the judgment result by the accuracy judgment part 16, positions of answer columns including wrong answers are identified (step S7). To be more specific, answer columns 8 closest to an accuracy judgment mark "O" (for example the center position of O) to indicate a wrong answer as judged by the accuracy judgment part 16 are extracted from the layout information (FIG. 3) of the test material 7 registered in the database 2. Finally, the position information (coordinate data) of the answer columns other than those judged to include correct answers by the accuracy judgment marks is read from the database 2 as the position data of answer columns including wrong answers.

For example, concerning the layout information shown in FIG. 3, from among the three answer columns 1-1, 1-2, 1-3, the position information (x15,y15) (x16,y16) on an answer column other than two answer columns 1-1, 1-3, that is, the answer column 1-2, is read from the database 2 as the position data of answer columns including wrong answers. For the remaining questions (Questions 2 through 5) also, the position data of answer columns including wrong answers is read from the database 2. In this way, on the test material 7 shown in FIG. 7, the position information (coordinate data) of total four answer columns each corresponding to Questions 1, 2, 3 or 5 is identified as the "positions of answer columns including wrong answers".

Next, the educational material data generation part 18 performs the conversion processing to convert an answer column including a wrong answer whose position has been identified by the wrong answer position identification part 17 to a state of a blank column (step S8). For example, concerning the portion of Question 1 of the test material 7 shown in FIG. 7, the answer column 8 where an accuracy judgment mark ("O") is not entered is replaced with an area frame specified by the coordinate values of the answer column 8 or the original image data of an area frame specified by the coordinate values of Question 1 in order to convert the answer column 8 to a blank column.

Figure 8:
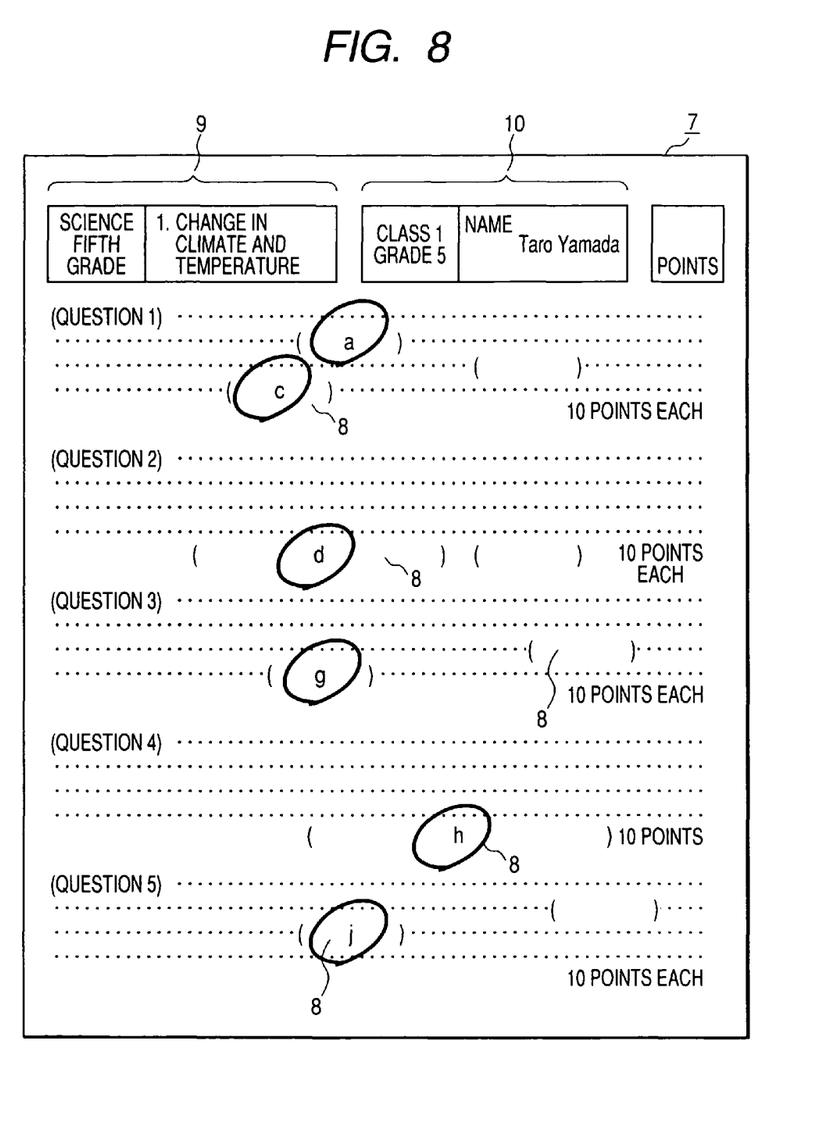
FIG. 8 is a schematic view showing a specific example of a test material printed for a retest.

Next, the educational material data generation part 18 generates the image data of a test material including questions corresponding to the answer columns including wrong answers whose positions have been identified by the wrong answer position identification part 17 (step S9). In this practice, in the image data of the test material generated by the educational material data generation part 18, all answer columns judged to include wrong answers by the marking of the last test appear as blank column as shown in FIG. 8. This is the end of the processing on a sheet of test material 7 by the image processor 3.

The data management part 4 determines whether a management table on the test material identified by the educational material identification part 12 is registered in the database 2 concerning the answerer information extracted by the answerer information extraction part 14 (step S10). In case the management table is not registered, the data management part 4 creates a management table anew including educational material identification information and answerer information as attribute information, and registers the new management table in the database 2 (step S11).

Figure 5:
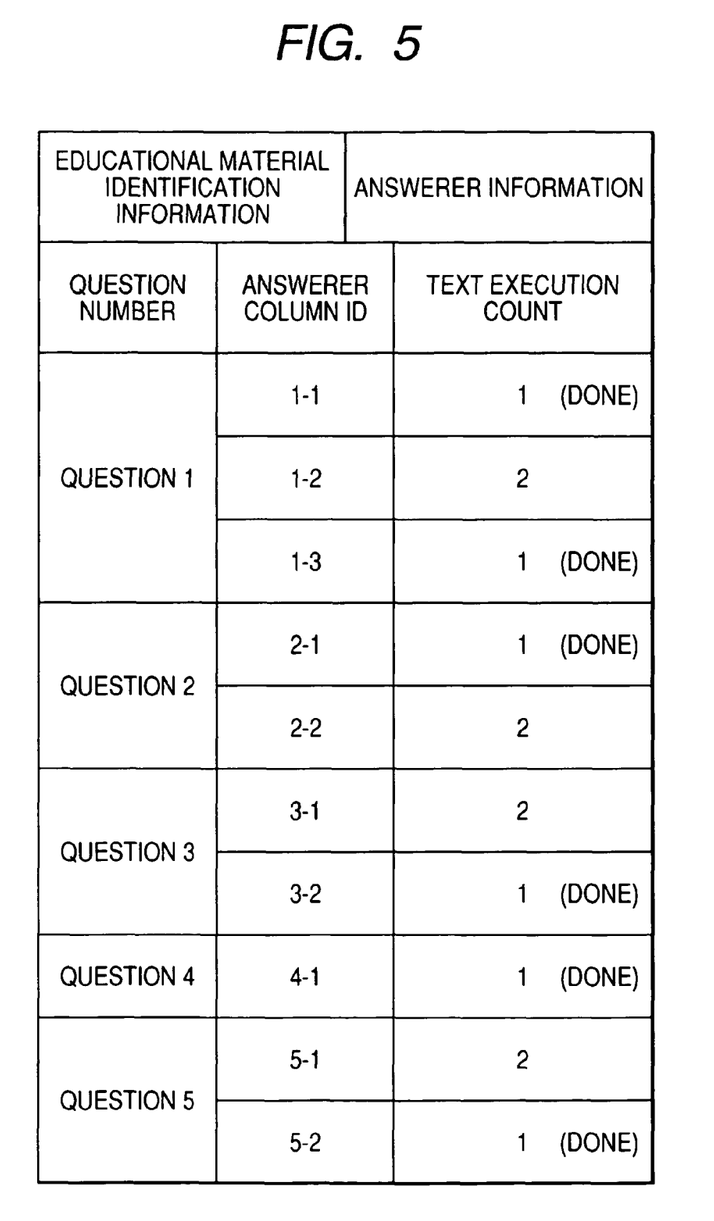
FIG. 5 shows an example of management table.

The data management part 4 updates the test execution count (numeric value) in the management table based on the image data of the test material 7 representing the current marking result (step S12). In the update processing, which answer columns include wrong answers is determined when the wrong answer position identification part 17 has identifies the positions of answer columns including wrong answers in accordance with the image data of the test material 7 input (scanned) this time. The data management part 4 increments the test execution count by 1 corresponding to the answer columns judged to include wrong answers in the current marking while referencing the information on which answer columns include wrong answers. An answer column whose test execution count is not incremented this time has included a correct answer either in the current marking or previous marking opportunities. As shown in FIG. 5, a "Done" mark indicating that the correct answer has been entered may be given to an answer column whose text execution count is not incremented. This allows the user to readily discriminate on the management table those questions that have reached correct answers from those questions not yet answered correctly.

The data management part 4 then checks for presence of a question whose text execution count is incremented, that is, an answer column including a wrong answer. In case such an answer column is present, the data management part 4 instructs the printing part 5 to print the test material (steps S13, S14). As instructed, the printing part 5 prints the image data of the test material 7 previously generated by the educational material data generation part 18 on a sheet of paper (step A15). This provides a test material for a retest. The data management part 4 then checks on the image input part whether the test material 7 to be transferred next still remains on the document glass of the ADF (step S16). In case the test material 7 is still on the document glass of the ADF, control returns to step S1 and repeats the same processing. Otherwise, the management part 4 completes the series of processing.

In this way, with the educational material processing apparatus and the educational material processing method according to this embodiment, when the image of an test material 7 illustrated in FIG. 2 is read by the image input part 1 and the image data of the test material 7 is input, the position of an answer column 8 judged to include a wrong answer by an accuracy judgment mark described on the test material 7 is identified. The answer column is converted to a blank column. Then the image data of the test material for a retest that covers the question corresponding to the answer column including a wrong answer is generated. The image data of the test material is printed on a sheet of paper, which provides a test material where all answer columns including wrong answers in the current test appear blank. This allows a retest to be conducted by using incorrectly answered questions without the need to erase every wrong answer with an eraser in repetitive learning practices where tests are repeated until all questions are correctly answered.

A management table is registered in the database 2 on a per test material basis and on an answerer basis. The data management part 4 manages the test execution count up to when a correct answer is entered in an answer column corresponding to each of a plurality of questions included in a test material. By displaying the management table for example on the display unit of the UI part 6 and checking the management table, it is possible to readily grasp the repetitive learning history of each answerer concerning individual test materials.

The invention may be provided as an educational material processing program that causes a computer to execute the steps of the above educational material processing method (excluding image reading in step S1 and image data printout in step S15). Or, the invention may be provided as a computer-readable recording medium (for example CD-ROM) storing the educational material processing program thereon.
In addition, in the present embodiment, the preferred specific examples of the invention are described, but the invention is not limited thereto. For example, the above-mentioned distortion correcting process or the disconnection correcting process is not necessarily performed. Further, while the marking of test papers is done to enter the figure (O) for a correct answer and the figure (X) for an incorrect answer in the embodiment as above, another figures may be used. For example, a check mark can be used for a correct answer.

The entire disclosure of Japanese Patent Application No. 2005-223697 filed on Aug. 2, 2005 including specification, claims, drawings and abstract is incorporated herein by reference in its entirety.

What is claimed is:

1. An educational material processing apparatus comprising:
   an input unit that inputs an image data of a test material including a plurality of questions which are of a fill-in-the-blank type, a plurality of answer columns arranged in sentences of the plurality of questions, and accuracy judgment marks, the accuracy judgment marks being grading marks formed by a human that indicate whether answers included in the answer columns are correct or not, each of the answer columns being embedded in a corresponding one of the plurality of questions;
   a handwritten mark detection unit that is configured to detect the accuracy judgment marks that are handwritten, based on a first predetermined shape for a right answer and a second predetermined shape for a wrong answer;
   a layout information storing unit that stores layout information representing positions of each of the plurality of questions and positions of each of the plurality of answer columns of the test material as two-dimensional coordinate data;
   an identification unit that identifies a position of an answer column judged to include a wrong answer based on at least one of the accuracy judgment marks in the image data of the test material, by extracting an answer column closest to a center of the at least one accuracy judgment mark, which is detected by the handwritten mark detection unit, from the layout information;
   a generation unit that modifies the image data of the test material to generate a new image of the test material, replacing an image of a question including the answer column judged to include the wrong answer with an original image of a question including a sentence of the question and a blank answer column corresponding to the answer column judged to include the wrong answer; and
   a printing unit that prints the new image data of the test material if at least one wrong answer is detected by the identification unit.

2. The educational material processing apparatus according to claim 1, wherein
   the input unit includes an image read unit that reads the image of the test material.

3. The educational material processing apparatus according to claim 1, wherein
   the layout information storing unit includes a database in which to register the positions of the plurality of answer columns in the test material; and
   the identification unit extracts the accuracy judgment marks from the input image data of the test material and compares the positions of the extracted accuracy judgment marks with the positions of the plurality of answer columns registered in the database to identify the position of the answer column including the wrong answer.

4. The educational material processing apparatus according to claim 1, further comprising:
   a management unit that includes a management table including a test execution count up to when a correct answer is entered in an answer column corresponding to each of the plurality of questions on a per test material basis and on a per answerer basis.

5. The educational material processing apparatus according to claim 1, further comprising:
   a management unit increments a test execution count each time a wrong answer is entered, up to when a correct answer is entered in an answer column corresponding to each of the plurality of questions on a per test material basis and on a per answer basis.

6. The educational material processing apparatus according to claim 1, wherein
   the generating unit generates the new image data without converting an area frame of the test material, which is specified by a position of an answer column judged to include a correct answer.

7. An educational material processing method comprising:
   inputting an image data of a test material including a plurality of questions which are of a fill-in-the-blank type, a plurality of answer columns arranged in sentences of the plurality of questions, and accuracy judgment marks, the accuracy judgment marks being grading marks formed by a human that indicate whether answers included in the answer columns are correct or not, each of the answer columns being embedded in a corresponding one of the plurality of questions;
   detecting the accuracy judgment marks that are handwritten, based on a first predetermined shape for a right answer and a second predetermined shape for a wrong answer;
   storing layout information representing positions of each of the plurality of questions and positions of each of the plurality of answer columns of the test material as two-dimensional coordinate data;

identifying a position of an answer column judged to include a wrong answer based on at least one of the accuracy judgment marks in the image data of the test material, by extracting an answer column closest to a center of the at least one accuracy judgment mark, which is detected by the handwritten mark detection unit, from the layout information;

modifying the image data of the test material to generate a new image data of the test material, by replacing an image of a question including the answer column judged to include the wrong answer with an original image of a question including a sentence of the question and a blank answer column corresponding to the answer column judged to include the wrong answer; and printing on a printer device the new image data of the test material if at least one wrong answer is detected by the identification unit, and if no wrong answers are detected, not printing on a printer device the new image data of the test.

8. A non-transitory computer-readable recording medium storing a program of instructions for enabling a computer to perform a function for processing an educational material, the function comprising:

inputting an image data of a test material including a plurality of questions which are of a fill-in-the-blank type, a plurality of answer columns arranged in sentences of the plurality of questions, and accuracy judgment marks, the accuracy judgment marks being grading marks formed by a human that indicate whether answers included in the answer columns are correct or not, each of the answer columns being embedded in a corresponding one of the plurality of questions;

detecting the accuracy judgment marks that are handwritten, based on a first predetermined shape for a right answer and a second predetermined shape for a wrong answer;

storing layout information representing positions of each of the plurality of questions and positions of each of the plurality of answer columns of the test material as two-dimensional coordinate data;

identifying a position of an answer column judged to include a wrong answer based on at least one of the accuracy judgment marks in the image data of the test material, by extracting an answer column closest to a center of the at least one accuracy judgment mark, which is detected by the handwritten mark detection unit, from the layout information;

modifying the image data of the test material to generate a new image data of the test material, by replacing an image of a question including the answer column judged to include the wrong answer with an original image of a question including a sentence of the question and a blank answer column corresponding to the answer column judged to include the wrong answer; and printing the new image data of the test material if at least one wrong answer is detected by the identification unit, and if no wrong answers are detected, not printing the new image data of the test.

\* \* \* \* \*